United States Patent
Mares et al.

(10) Patent No.: US 10,949,617 B1
(45) Date of Patent: Mar. 16, 2021

(54) SYSTEM FOR DIFFERENTIATING ENCODING OF TEXT FIELDS BETWEEN NETWORKED SERVICES

(71) Applicant: AMAZON TECHNOLOGIES, INC., Seattle, WA (US)

(72) Inventors: Jiri Mares, Seattle, WA (US); Himesh Kumar, Seattle, WA (US); Addison Phillips, San Jose, CA (US); Viktor Iourievich Tarassov, Bellevue, WA (US); Andrew Ross Evenson, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 148 days.

(21) Appl. No.: 16/145,006

(22) Filed: Sep. 27, 2018

(51) Int. Cl.
    *G06F 40/30*     (2020.01)
    *H04L 29/08*     (2006.01)

(52) U.S. Cl.
    CPC .............. *G06F 40/30* (2020.01); *H04L 67/16* (2013.01)

(58) Field of Classification Search
    None
    See application file for complete search history.

(56) References Cited

U.S. PATENT DOCUMENTS

| | | | | |
|---|---|---|---|---|
| 7,148,824 B1 * | 12/2006 | Porter, III | ............. | G06F 40/126 341/90 |
| 7,218,252 B2 * | 5/2007 | Fauque | ................. | G06F 40/126 341/50 |
| 8,228,215 B1 * | 7/2012 | Runge | .................. | G06F 40/126 341/82 |
| 9,450,607 B1 * | 9/2016 | Alakuijala | .......... | H03M 7/6005 |
| 10,019,378 B1 * | 7/2018 | Alakuijala | .......... | H03M 7/3086 |
| 10,037,309 B1 * | 7/2018 | Wang | ...................... | H03M 7/70 |
| 10,089,281 B1 * | 10/2018 | Neumann | ............... | H03M 7/14 |
| 10,644,720 B2 * | 5/2020 | Noma | ..................... | H03M 7/40 |
| 2008/0243490 A1 * | 10/2008 | Bush | ...................... | G06F 40/129 704/201 |
| 2010/0114559 A1 * | 5/2010 | Kim | ...................... | G06F 40/263 704/8 |
| 2011/0173434 A1 * | 7/2011 | Buckley | .............. | H04L 65/1016 713/150 |
| 2012/0233187 A1 * | 9/2012 | Chang | .................. | G06F 40/151 707/755 |

(Continued)

*Primary Examiner* — Jonathan C Kim
(74) *Attorney, Agent, or Firm* — Lindauer Law, PLLC (57) ABSTRACT

Techniques for determining the relationships between a network of services include determining encoding of text fields received and transmitted by the services. Correspondence between the bytes representing a text string in a first data field and encoding data that associates byte characteristics with encoding schemes may be used to determine the encoding scheme associated with the first data field. Other data fields that were transmitted or received close-in-time to the first data field and have a value within a threshold similarity of that of the first data field may be determined to be associated with the first data field. Subsequent to a modification to the network of services, if the encoding of one or more data fields changes or if the associations between data fields change, the particular services that were affected by the modification may be determined based on the differences in encoding schemes and data field associations.

20 Claims, 5 Drawing Sheets

(56) References Cited

U.S. PATENT DOCUMENTS

| | | | |
|---|---|---|---|
| 2013/0191457 A1* | 7/2013 | Horsman | H04L 67/06 |
| | | | 709/204 |
| 2018/0034802 A1* | 2/2018 | Shelton | H04L 63/083 |
| 2018/0165269 A1* | 6/2018 | Liu | G06F 40/242 |
| 2019/0243878 A1* | 8/2019 | Kemmel | G06F 40/106 |
| 2020/0134254 A1* | 4/2020 | Neumann | G06F 16/24537 |

* cited by examiner

SYSTEM FOR DIFFERENTIATING ENCODING OF TEXT FIELDS BETWEEN NETWORKED SERVICES

BACKGROUND

Networked services send and receive payloads that include text strings to and from other services using various types of text encoding.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Online systems may use a large number of networked services that transmit different types of data to and from one another. For example, an online store, through which various items may be offered for sale and purchased, may include a collection of network-accessible services executed on computer hardware that provides multiple channels through which customers, using a client computing device, may access various catalogs stored in databases to find various products and services available to purchase, lease, and so forth. Channels for accessing catalogs may include, for example, mobile applications, voice-based search programs, web pages, and so forth. When a catalog is accessed, an item is purchased, or other transactions are performed, a potentially large number of services may be used to determine and process data from multiple sources. Due to the large number of services used to complete a transaction and the different types of data exchanged between services, the specific relationships between services and the specific data sent and received by each individual service may not be easily determined. Additionally, in some cases, multiple instances of identical data may be sent and received within a group of networked services, and the specific instance of a payload that is received by a particular service may not be evident. Further, in some cases, a service may transcode text strings, such as by receiving data encoded using a first encoding scheme and transmitting the data encoded using a second encoding scheme. Additionally, in some cases, a service may receive and process text strings using different encodings. For example, a dependent service may process text strings received from a first service using a first encoding scheme and from a second service using a second encoding scheme. Due to the unknown relationships between services, if a modification is made to a particular service, this modification may result in errors or other unintended changes in the services that provide data to or receive data from the particular service.

As one example, some of the data fields of a payload received by a service may include text strings. Continuing the example, a field such as "customer name" may include a text string indicative of the name of a user, while a field such as "gift message" associated with the purchase of an item as a gift for another individual may include a text string indicative of a message that is input by a user. Each service may be configured to process received text strings that are encoded using one or more specific text encoding schemes. For example, a first service may be configured to process text strings encoded using the ISO-8859-1 (e.g., "Latin-1") encoding scheme, in which the characters of the English alphabet, and certain extra characters, are each represented as a numeral ranging from 32 to 127 or 160 to 255, that may be stored in one byte of data. A second service may be configured to process text strings using the UTF-8 encoding scheme, in which a large number of characters are each represented by a Unicode hexadecimal code point and stored using a varying number of bytes depending on the code point for the character. For example, Unicode points corresponding to characters represented by Latin-1 numerals of 127 or less may be stored using a single byte, while other Unicode points may be stored using from two to six bytes. In some cases, a service may also be configured to transcode the text string using a different encoding scheme prior to transmitting the text string to a different service. If a service attempts to process a text string that is encoded using a different encoding scheme than that for which the service is configured, at least a portion of the text string may be lost. For example, if a service configured to use the Latin-1 encoding scheme attempts to store other characters not represented by the Latin-1 encoding scheme, such as Unicode characters, the values for these characters may be lost. Continuing the example, one or more Unicode characters that are not represented in the Latin-1 encoding scheme may be mapped to a question mark. Unicode characters stored using more than one byte typically correspond to characters not found in the English alphabet and special characters, such as emojis. As such, if the first service were to receive a UTF-8 text string from the second service, one or more characters of the UTF-8 text string that do not correspond to Latin characters may be lost when attempting to process the text string using the Latin-1 encoding scheme. In a similar manner, if the first service were modified to begin using the UTF-8 encoding scheme rather than the Latin-1 encoding scheme, other services that receive text strings from the first service that are not configured to process UTF-8 text strings may fail to properly store or process the text strings. Therefore, an attempt to modify one or more services, such as by updating a service that utilizes ASCII or Latin-1 encoding schemes to begin utilizing the UTF-8 encoding scheme may inadvertently cause text strings to become partially or wholly garbled.

Described in this disclosure are techniques for determining the encoding schemes used by multiple services within a system, and determining the relationships between services based in part on the determined encoding schemes. For example, relationships between services may include dependencies, such as the particular payloads, or particular data fields within payloads, that are transmitted between various services. As used herein, the term "service" may also include processes, applications, or other operations performed by one or more computing devices to generate, transmit, or receive data. After the encoding schemes and relationships between services are known, this data for an initial version of a system of services may be compared with similar data obtained for a modified version of the system of services to determine differences between the two systems. For example, a single service within a system may be modified to begin using UTF-8 encoding rather than Latin-1 encoding. After such a modification, the encoding associated with the single service may differ, but other differences in encoding or relationships between services would not typically be expected. If a comparison between this data for an initial version of the services and similar data for a modified version of the services indicates other differences, these differences may indicate that the modification to the single service has inadvertently affected the data received by other services. For example, a first service may receive three inbound data fields that include text strings associated with a "gift message" field of a payload and transmit six outbound data fields that include text strings associated with the "gift message" field. If the first service is modified to begin using a different encoding scheme and the modified version of the first service appears to only transmit five outbound data fields that include the text string associated with the "gift message" field, the absence of the expected sixth outbound data field may indicate that the text string for the sixth outbound data field has become garbled due to the modification to the first service. In a similar manner, other services that transmit data to or receive data from the first service may be affected by the modification to the first service, resulting in other differences in encodings or service relationships.

To determine the text encoding schemes used by a service, a payload received by a service may be analyzed. In some implementations, the payload may be accessed using TCP-Dump or another type of software for packet analysis. A data field within the payload that includes a text string may be determined. Data fields that include other types of data that would not typically be encoded using a text encoding scheme, such as Boolean values or numerical values, may be disregarded. Disregarding data fields that do not include text fields may reduce the number of data fields to be analyzed by as much as 50% or more. The value of a data field containing a text string may be encoded as one or more bytes. Correspondence between the bytes that represent the value of the data field and encoding data that associates byte characteristics with encoding schemes may be determined. For example, the encoding data may include a utility library or other type of data repository that may be used to identify the text encoding scheme used to encode a text string based on the characteristics of the bytes representing the text string. Continuing the example, if the bytes representing a text string lack a high bit set or do not match the UTF-8 bit pattern, this may indicate that the bytes are more likely encoded using ASCII or Latin-1 rather than UTF-8. Conversely, if a text string includes bytes with a high bit set and one or more characters of a text string are encoded using more than a single byte, this may indicate that the bytes are more likely encoded using UTF-8. A particular data field may be analyzed multiple times, for multiple payloads, to determine the encoding scheme associated with the data field within a threshold level of confidence. For example, if a particular payload stored in a data field associated with UTF-8 encoding does not include any high-bit characters, that particular payload may appear to be associated with ASCII or Latin-1 encoding. However, if multiple payloads stored in the data field are analyzed, and one or more of the payloads include valid Unicode, this may instead indicate that the data field is associated with UTF-8 encoding. Similarly, if a Latin-1 byte sequence coincidentally matches a valid UTF-8 encoding of a Unicode code point, the data field may appear to be associated with UTF-8 encoding. However, if multiple payloads stored in the data field are analyzed, and one or more of the payloads includes bytes that are not valid UTF-8, this may indicate that the data field is associated with Latin-1 encoding.

In some implementations, the text encoding scheme associated with a data field may be determined in part by decoding the bytes representing the text string to yield the text string, then re-encoding the text string to determine whether the re-encoded bytes match the original bytes representing the text string. For example, decoding a text string encoded using the UTF-8 encoding scheme may result in a text string that includes Latin characters, and in some cases, special characters not represented by the Latin-1 encoding scheme. If re-encoding the text string results in bytes that match the original bytes, then this may indicate that the text string was encoded using valid Unicode. If re-encoding the text string does not result in bytes that match the original bytes, then this may indicate that the original bytes representing the text string do not include valid Unicode. As another example, if a text string is double encoded using the UTF-8 encoding scheme, decoding the bytes representing the text string one time may yield bytes that are single-encoded using the UTF-8 encoding scheme. As such, if the decoded bytes are determined to include valid Unicode, this determination may indicate that the original bytes were double encoded using UTF-8 encoding.

After the encoding of a field for a particular service is known, other services that receive this field from the particular service or transmit this field to the particular service may be determined. For example, the value for a particular inbound field received by a first service may be compared to a value for a particular outbound field transmitted by the first service or another service. If the values are identical or within a threshold similarity of one another and the inbound field occurred close in time to the outbound field, this may indicate that the two data fields are correlated. For example, a second service may receive a particular data field from the particular service, or from one or more intermediate services. In a similar manner, one or more outbound fields from a service may be correlated to a corresponding inbound field received by another service. To conserve time and computational resources, the particular fields that are searched to determine corresponding values for an inbound field may be limited to outbound fields that were transmitted within a threshold time of the time at which the inbound field was received. Similarly, corresponding values for outbound fields may be limited to inbound fields that were received within a threshold time of the time at which an outbound field was transmitted. In some cases, when two services exchange data, the threshold time may be determined based on the length of time between the time at which a request field was received or transmitted by a first service and the time at which the service received or transmitted a response associated with the field. The threshold level of similarity between corresponding values may not necessarily require that the values for the fields be identical. For example, a "gift message" field may include the message "Happy Birthday!" followed by an emoji, encoded using UTF-8. If this message is received by a service that attempts to decode the text string using Latin-1, the emoji may instead be mapped to a question mark. However, the value of the decoded field would still include the text string "Happy Birthday!" followed by the question mark. Due to the high degree of similarity between the fields, the relationship between the two services may be determined even though the encoding used by the receiving service differs from the encoding used by the transmitting service.

In some implementations, a particular value may correspond to multiple other fields. For example, a particular instance of a text string may be transmitted to and received by different services. The number of inbound fields and number of outbound fields that include a particular value may be determined and used to differentiate relationships between an initial set of services from relationships between a modified set of services. For example, if an initial set of services is associated with three inbound fields and six outbound fields that include the text string "Happy Birthday!", and a modified version of the set of services is associated with three inbound fields and only five outbound fields, the absence of an expected relationship may indicate that the value for the expected sixth outbound field has become garbled or otherwise lost due to the modification to the services.

As one skilled in the art will appreciate in light of this disclosure, certain embodiments may be capable of achieving certain advantages, including some or all of the following: Use of the techniques described herein may enable text encodings and relationships between services to be determined based on raw data captured from live traffic, such as through use of packet capture software. Analysis of live traffic in this manner may consume less time and computational resources when compared to analysis of the code associated with various services. Additionally, when encoding schemes and correlated data fields within a network of services are known, the source of various errors or other unexpected values or losses of data may be determined rapidly, without requiring extensive analysis of the networked services or the underlying code for the services, conserving significant time and computational resources. Further, the relationships and encoding schemes determined for a network of services may be used to facilitate modifications to the services, such as a migration of one or more services to begin utilization of an alternate encoding scheme. Differences in determined encoding schemes and relationships between services for an initial version of a network of services and a modified version of the services may be used to efficiently determine any unintended changes or losses of data that result from a modification, and to identify the source of such unintended changes or losses.

Figure 1:
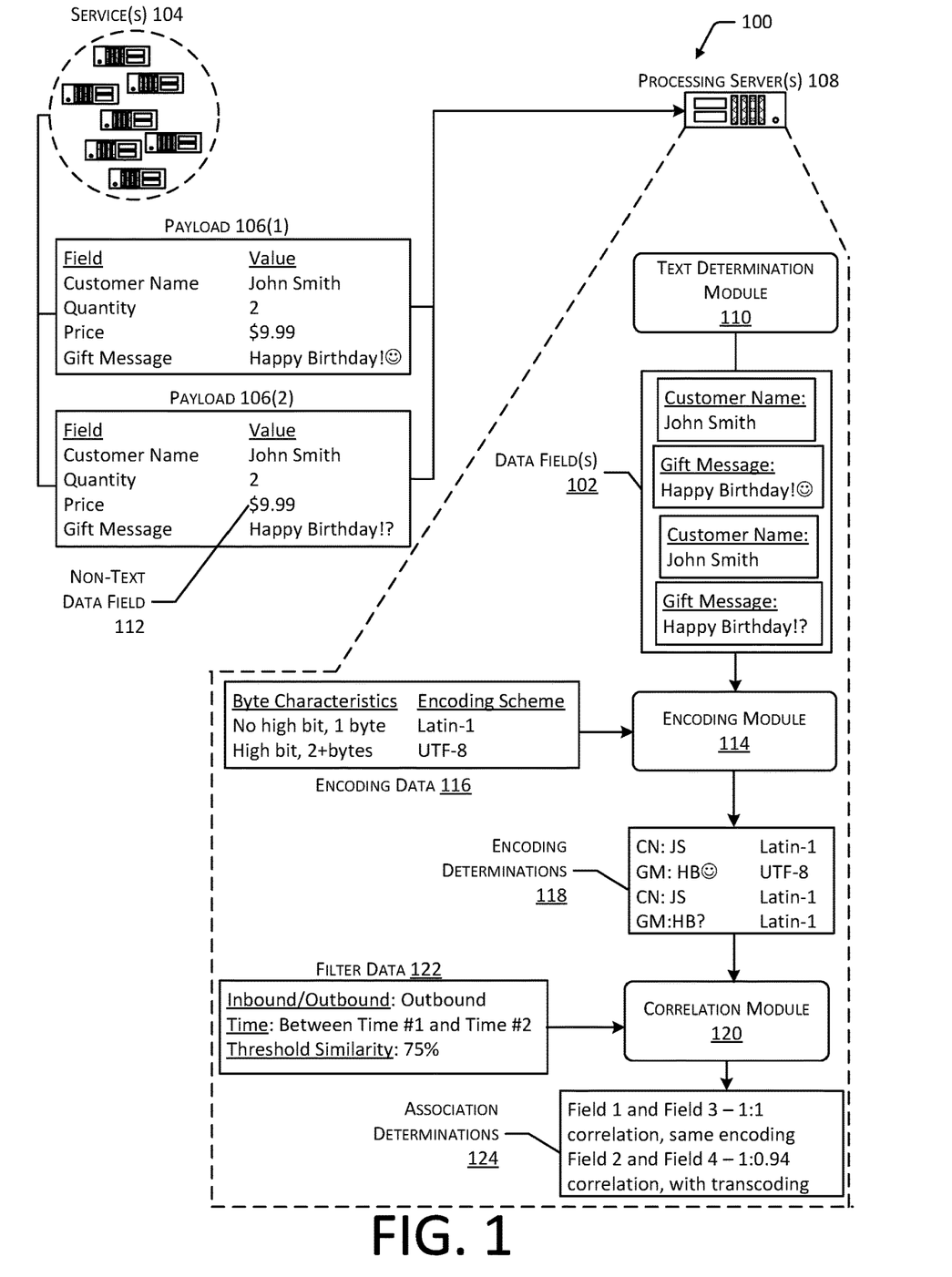
FIG. 1 depicts an implementation of a system for determining relationships between data fields exchanged by a plurality of services.

FIG. 1 depicts an implementation of a system 100 for determining relationships between data fields 102 exchanged by a plurality of services 104. By way of example, FIG. 1 depicts a plurality of services 104 generating a first example payload 106(1) and a second example payload 106(2). While FIG. 1 illustrates the services 104 as being associated with multiple servers, in other implementations, the services 104 may be executed using any number and any type of computing devices. A payload 106 may include any manner of data transmitted from one service 104 to another service 104, from a service 104 to a client device, or received by a service 104 from an external source, such as a client device. For example, a payload 106 may include one or more of alphanumeric data, audio data, image data, video data, haptic data, or other types of data or metadata. Continuing the example, FIG. 1 depicts the first payload 106(1) and second payload 106(2) including alphanumeric data associated with a purchase of an item as a gift for an individual. Specifically, each payload 106 is shown including four example data fields 102, "Customer Name", "Quantity", "Price", and "Gift Message", each data field 102 being associated with a corresponding value. While FIG. 1 depicts two example payloads 106 having identical data fields 102 and similar values for each data field 102, a network of services 104 may transmit and receive any number of similar and dissimilar payloads 106.

To determine encoding schemes associated with the payloads 106 and relationships between one or more of the services 104, one or more processing servers 108, or other types of computing devices, may receive one or more payloads 106 from the services 104. For example, a processing server 108 may monitor traffic associated with the services 104 and determine data indicative of the traffic, such as through use of TCPDump software or similar techniques. Each payload 106 may include multiple data fields 102, and each data field 102 may store different types of data. For example, FIG. 1 depicts the first payload 106(1) and second payload 106(2) including text strings in the "Customer Name" and "Gift Message" data fields 102, and numerical data in the "Quantity" and "Price" data fields 102. A text determination module 110 may determine particular data fields 102 within the payloads 106 that include text strings. As described previously, analysis of data fields 102 that include text strings while omitting analysis of other data fields 102 that would not typically be encoded using a text encoding scheme may conserve time, cost, and computational resources when compared to analysis of payloads 106 that do not include data fields 102 containing text strings, or analysis of entire payloads 106 when only certain data fields 102 include text strings. For example, FIG. 1 depicts the text determination module 110 determining four data fields 102 that include text strings based on the first payload 106(1) and second payload 106(2). Other non-text data fields 112 associated with the payloads 106 may be omitted from analysis.

An encoding module 114 may determine the specific text encoding schemes used to encode the text strings for at least a portion of the data fields 102. For example, the data fields 102 may each be stored as a set of bytes representing the encoded text string. The characteristics of the sets of bytes may be determined based on the encoding scheme used to encode the text string. Continuing the example, text strings encoded using the UTF-8 encoding scheme may include bytes representing high-bit characters, characters that are represented by two or more bytes, and bytes that include valid Unicode points. Conversely, text strings encoded using the Latin-1 encoding scheme may include bytes that lack high-bit characters and characters represented by a single byte. The encoding module 114 may determine correspondence between the bytes of the data fields 102 and encoding data 116 that associates byte characteristics with corresponding encoding schemes. For example, FIG. 1 depicts example encoding data 116 that associates the byte characteristics "no high bit, 1 byte" with the Latin-1 encoding scheme and the byte characteristics "high bit, 2+bytes" with the UTF-8 encoding scheme.

Based on correspondence between the encoding data 116 and the data fields 102, the encoding module 114 may generate one or more encoding determinations 118 indicative of the encoding scheme associated with at least a portion of the data fields 102. For example, a data field 102 from the first payload 106(1) that includes the text string "John Smith" may lack high-bit characters or characters encoded using more than one byte, and may be determined to most likely be associated with Latin-1 encoding. A data field 102 from the second payload 106(2) that includes the text string "John Smith" may similarly be determined to be associated with Latin-1 encoding. A data field 102 from the first payload 106(1) that includes the text string "Happy Birthday!" followed by an emoji may be determined to include a high bit character that is encoded using two or more bytes, due to the emoji being represented by a Unicode point that is encoded using more than one byte. As such, this data field 102 may be determined to be associated with UTF-8 encoding. A similar data field 102 from the second payload 106(2) that includes the text string "Happy Birthday!?" may be determined to include no high-bit characters or characters encoded using more than one byte, and as such, most likely to be associated with Latin-1 encoding. As discussed previously, in some implementations, the encoding module 114 may analyze multiple payloads 106 associated with a data field 102 and generate multiple encoding determinations 118 for the data field 102 to determine the encoding associated with the data field 102 with a threshold level of confidence. For example, a data field 102 containing the text string "John Smith", which lacks high-bit characters, may possibly be associated with Latin-1 encoding or UTF-8 encoding. However, if a subsequent text string associated with a subsequent payload 106 includes high-bit characters represented using valid Unicode, this may indicate that the data field 102 is associated with UTF-8 encoding. If a threshold number of payloads 106 do not include any high-bit characters, this may indicate, within a threshold level of confidence, that the data field 102 is associated with Latin-1 encoding.

In some implementations, the encoding module 114 may be configured to decode or transcode one or more of the data fields 102, such as to verify that a text string is encoded using valid Unicode. For example, the encoding module 114 may decode a data field 102 associated with UTF-8 encoding using Unicode to yield the text string, then re-encode the text string. If the bytes representing the re-encoded text string match the initial bytes that were decoded, this may verify that the text string was encoded using valid Unicode. As another example, the encoding module 114 may transcode a data field 102 associated with UTF-8 encoding to Latin-1 encoding, then determine whether the transcoded data field 102 includes valid Unicode. If the transcoded data field 102 includes valid Unicode, then this may indicate that the original data field 102 is associated with double-encoded UTF-8. If the transcoded data field 102 includes Latin-1 encoding and does not include valid Unicode, then this may indicate that the original data field 102 is associated with single-encoded UTF-8.

A correlation module 120 may determine associations between data fields 102 based on the encoding determinations 118 and the values within the data fields 102. For example, if a first service 104 transmits a data field 102 to a second service 104, which in turn transmits the data field 102 to a third service 104, each instance of the data field 102 may include a similar value, such as a text string within a threshold similarity of the text strings of the other data fields 102. In some cases, a particular service 104 may transcode a data field 102. For example, two data fields 102 may include text strings that are within a threshold similarity of one another, but each data field 102 may be encoded using a different encoding scheme. In some implementations, the correlation module 120 may access filter data 122 to determine a subset of data fields 102 associated with the services 104 to be analyzed. For example, the correlation module 120 may access a first data field 102 and determine whether the first data field 102 is an inbound data field 102 received by a service 104 or an outbound data field 102 transmitted by a service 104. The filter data 122 may cause the correlation module 120 to analyze outbound data fields 102 for relationships with an inbound data field 102, and inbound data fields 102 for relationships with an outbound data field 102. For example, if a service 104 receives an inbound data field 102, another inbound data field 102 is unlikely to be related to the data field 102 that was received. Analyzing outbound data fields 102 while disregarding other inbound data fields 102 from analysis may conserve time, cost, and computational resources.

In some implementations, the filter data 122 may cause the correlation module 120 to analyze data fields 102 associated with a particular window of time. For example, an outbound data field 102 that is related to an inbound data field 102 received by a service 104 will most likely be transmitted close-in-time to the time that the inbound data field 102 was received. As such, the filter data 122 may cause the correlation module 120 to analyze data fields 102 transmitted within a threshold length of time of the time at which a data field 102 was received by a service 104. In other implementations, the correlation module 120, or another module associated with the processing server(s) 108, may determine a first time at which a data field 102 associated with a request is received or transmitted by a service 104 and a second time at which a response associated with the request is transmitted or received. Based on the length of time between the first time and the second time, the filter data 122 may include a threshold window of time, such as the window of time between the first time and the second time, or a window of time that is within a threshold length of time from the first time or the second time.

The filter data 122 may also indicate a threshold similarity that may be used to determine a relationship between two data fields 102. For example, the values stored in two data fields 102 may be related without necessarily being wholly identical. Continuing the example, if a first data field 102 associated with UTF-8 encoding includes both Latin characters and Unicode characters and a second data field 102 associated with Latin-1 encoding includes the same text string, attempts to store the Unicode characters in the second data field 102 may result in the Unicode characters being lost or modified. FIG. 1 depicts an example scenario in which a data field 102 associated with the first payload 106(1) includes a text string with the Latin characters "Happy Birthday!" followed by an emoji that may be represented by Unicode bytes. A similar data field 102 associated with the second payload 106(2) includes a similar text string with the Latin characters "Happy Birthday!", followed by a Latin question mark character. For example, attempts to encode a Unicode character using the Latin-1 encoding scheme may result in the Unicode character being mapped to a question mark. The two text strings may therefore be within a threshold level of similarity with regard to one another (e.g., 94 percent of the characters in the text strings are identical), and as such, the correlation module 120 may determine an association between the data fields 102.

The correlation module 120 may generate association determinations 124 indicative of associations between various data fields 102 exchanged between the services 104. For example, FIG. 1 depicts an example scenario in which the text strings included in the "Customer Name" data field 102 in the first payload 106(1) and second payload 106(2) are identical, and in which each instance of the "Customer Name" data field 102 is associated with the same encoding scheme. As such, the correlation module 120 may generate an association determination 124 that indicates that the two data fields 102 share a 1:1 correlation and are associated with the same encoding scheme. FIG. 1 also depicts the text strings included in the "Gift Message" data field 102 in the first payload 106(1) and second payload 106(2) being approximately 94% identical. For example, the data field 102 associated with the first payload 106(1) includes the value "Happy Birthday!" followed by an emoji associated with UTF-8 encoding, while the data field 102 associated with the second payload 106(2) includes the value "Happy Birthday!" followed by a question mark associated with Latin-1 encoding. As such, the correlation module 120 may generate an association determination 124 indicating a 1:0.94 correlation between the data fields 102 and an indication that the data fields 102 include different encoding schemes. Such an indication may indicate that one or more of the services 104 may transcode the data field 102 when transmitting a payload 106 to another service 104.

In some implementations, the correlation module 120 may also transcode a data field 102, then determine if one or more other data fields 102 correspond to the transcoded data field 102. For example, transcoding an initial data field 102 from Latin-1 encoding to UTF-8 encoding, or from single-encoded UTF-8 encoding to double-encoded UTF-8 encoding may cause the associated text string to be modified. However, if another data field 102 includes a value within a threshold similarity of the modified text string, this correspondence may indicate that one or more services 104 are configured to transcode the data field 102 in a manner that is causing modification of the text string. Identifying the data fields 102 that correspond to the modified data field 102 may enable the services 104 that transcode the data field 102 to be identified.

Figure 2:
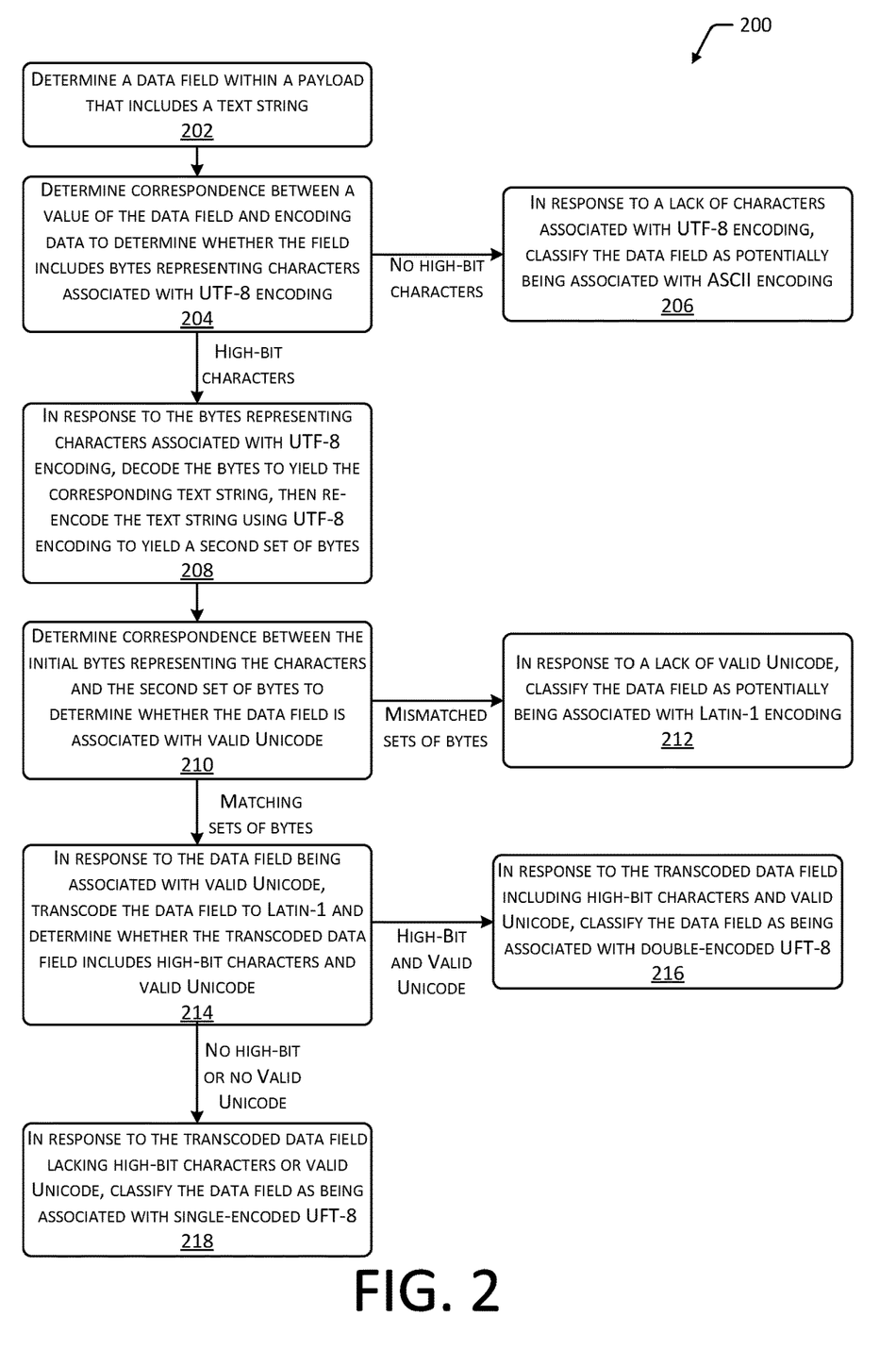
FIG. 2 is a flow diagram illustrating a method for determining an encoding scheme associated with a data field.

FIG. 2 is a flow diagram 200 illustrating a method for determining an encoding scheme associated with a data field 102. The example implementation illustrated in FIG. 2 may be used to differentiate between data fields 102 associated with Latin-1 encoding, ASCII encoding, UTF-8 or other Unicode-based encoding schemes, and double-encoded UTF-8 data fields 102. However, in other implementations, other encoding schemes may be determined based on the characteristics of the bytes associated with the encoding schemes. As discussed previously, the process illustrated in FIG. 2 may be repeated multiple times for a particular data field 102 to analyze multiple payloads 106. For example, if a particular payload 106 lacks high-bit characters, the particular payload 106 may be associated with ASCII, Latin-1, or UTF-8 encoding schemes. However, if subsequent payloads 106 include invalid Unicode, this may indicate that the data field 102 is associated with Latin-1 or other encoding. If subsequent payloads 106 include valid Unicode and no indication of invalid Unicode, this may indicate that the data field 102 is associated with UTF-8 encoding. If a threshold number of payloads 106 are analyzed, and none of the payloads 106 include high-bit characters or valid Unicode, this may indicate that the data field 102 is associated with ASCII encoding.

At 202, a data field 102 within a payload 106 that includes a text string may be determined. As described with regard to FIG. 1, in some cases, a payload 106 may include multiple data fields 102, at least one of which includes a text string. A text determination module 110 may determine data fields 102 that includes text strings, which in some cases may be used to reduce the time, cost, and computational resources associated with analyzing data fields 102 that include Boolean values, numerals, or other types of data that are not encoded using text encoding schemes. For example, a data field 102 "Customer Name" that includes the value "John Smith" may be determined to include a text string, while a data field 102 "Quantity" that includes the value "2" may be determined to include data other than text strings.

At 204, correspondence between a value of the data field 102 and encoding data 116 may be used to determine whether the data field 102 includes bytes representing characters associated with UTF-8 encoding. As described with regard to FIG. 1, an encoding module 114 may determine correspondence between the encoding data 116 and one or more data fields 102. The encoding data 116 may associate byte characteristics with corresponding encoding schemes. For example, if the bytes associated with a data field 102 lack high-bit characters, the encoding data 116 may indicate that these byte characteristics are associated with ASCII encoding. In such a case, at 206, in response to a lack of characters associated with UTF-8 encoding, a data field 102 may be classified as potentially being associated with ASCII encoding. Continuing the example, a data field 102 "Customer Name" that includes the value "John Smith" would lack high-bit characters and as such, may be determined to most likely be associated with ASCII encoding. As described previously, however, a data field 102 may not be determined to be associated with ASCII encoding within a threshold level of confidence until a threshold number of payloads 106 that include no high-bit characters have been analyzed. For example, the value "John Smith" would not include high-bit characters even if the data field 102 in which the value is associated with used UTF-8 encoding. However, if a subsequent payload 106 includes a value within the data field 102 that includes high-bit categories, this may prevent the data field 102 from being classified as associated with ASCII encoding.

For example, a data field 102 "Customer Name" that includes the value "Günter Müller" may be determined to include characters associated with UTF-8 encoding. Continuing the example, a letter "u" that includes an umlaut punctuation may constitute a high-bit character associated with UTF-8 encoding. In such a case, the data field 102 may possibly be associated with UTF-8 encoding if the bytes representing the text string include valid Unicode.

As such, at 208, in response to the bytes representing characters associated with UTF-8 encoding, the bytes may be decoded to yield the text string. The text string may then be re-encoded using UTF-8 encoding to yield a second set of bytes. For example, decoding the bytes associated with a data field 102 then re-encoding the text string may verify whether the initial bytes representing the text string include valid Unicode. At 210, correspondence between the initial bytes representing the characters and the second set of bytes may be determined, which may in turn determine whether the data field 102 is associated with valid Unicode. If the initial bytes and the second set of bytes are identical, this may indicate that the data field 102 is associated with valid Unicode. For example, use of the UTF-8 encoding scheme to decode valid Unicode then re-encode the resulting text string would be expected to generate a set of bytes identical to the initial bytes that were decoded. However, if the initial bytes and the second set of bytes do not match, then this may indicate that the data field 102 does not include valid Unicode. For example, at 212, in response to a lack of valid Unicode, a data field 102 may be classified as potentially being associated with Latin-1 encoding. As described previously, a data field 102 may not be determined to be associated with Latin-1 encoding within a threshold level of confidence until a threshold number of payloads 106 have been analyzed. For example, a data field 102 associated with UTF-8 encoding would not be determined to include invalid Unicode. However, a data field 102 associated with Latin-1 encoding may possibly be determined to include valid Unicode if the Latin-1 bytes match a valid UTF-8 byte sequence.

If a data field 102 includes valid Unicode, as described with regard to FIG. 1, the data field 102 may be transcoded to determine whether the data field 102 is associated with single-encoded or double-encoded UTF-8 encoding. At 214, in response to a data field 102 being associated with valid Unicode, the data field 102 may be transcoded to Latin-1 to determine whether the transcoded data field 102 includes at least one high-bit character and valid Unicode. For example, the process described with regard to blocks 202 through 210 may be repeated for the transcoded data field 102 to determine whether the data field 102 includes one or more high-bit characters and if so, whether the data field 102 includes valid Unicode. If a data field 102 is associated with double-encoded UTF-8 encoding, then transcoding the data field 102 to Latin-1 would result in a transcoded data field 102 that includes valid Unicode. If a data field 102 is associated with single-encoded UTF-8 encoding, then transcoding the data field 102 to Latin-1 would result in a data field 102 that lacks valid Unicode. As such, at 216, in response to the transcoded data field 102 including one or more high-bit characters and valid Unicode, the data field 102 may be classified as being associated with double-encoded UTF-8 encoding. At 218, in response to the transcoded data field 102 lacking high-bit characters or valid Unicode, the data field 102 may be classified as being associated with single-encoded UTF-8.

Figure 3:
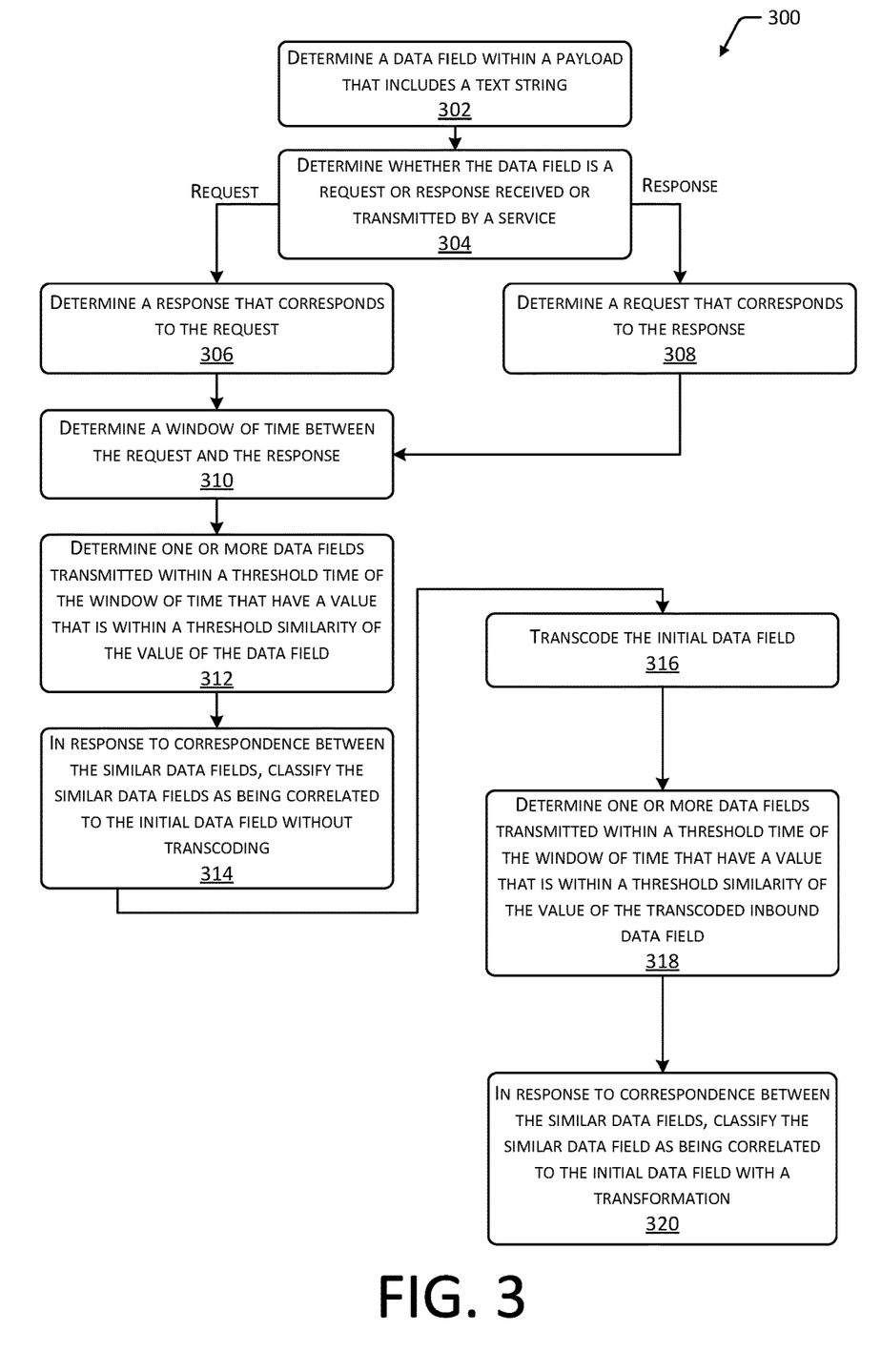
FIG. 3 is a flow diagram illustrating a method for determining associations between data fields exchanged by a set of services.

FIG. 3 is a flow diagram 300 illustrating a method for determining associations between data fields 102 exchanged by a set of services 104. As described with regard to FIG. 1, associations between data fields 102 may be used to determine relationships between services 104. For example, if an inbound data field 102 and an outbound data field 102 include the same value for a text string and were each sent close-in-time, then this may indicate that the two data fields 102 are related, such as by a dependency between services 104 that transmit and receive the data fields 102. If a first data field 102 and a second data field 102 are identical, but differ in associated encoding schemes, this may indicate that one or more services 104 that receive and transmit the data field 102 are configured to transcode the data field 102. If the value for a text string of a first data field 102 and the value for a second data field 102 differ slightly, but are within a threshold similarity of one another, this may indicate that one or more characters of a text string have become lost, garbled, or otherwise modified, such as due to an attempt to store characters of a text string that are not represented by the associated encoding scheme. As such, determining associations between data fields 102 may enable the services 104 associated with inadvertent modifications to values or losses of characters or other data to be determined.

At 302, a data field 102 within a payload 106 that includes a text string may be determined. As described with regard to FIGS. 1 and 2, a payload 106 may include multiple data fields 102, one or more of which may include a text string. A text determination module 110 may determine data fields 102 that include text strings, enabling data fields 102 associated with other types of data, as well as payloads 106 that lack text strings, to be disregarded.

At 304, a determination may be made as to whether a data field 102 is a request or response received or transmitted by a service 104. Determination as to whether a data field 102 is a request or response may be used to reduce the number of other data fields 102 that are analyzed to determine an association with a particular data field 102. For example, a request determined from a TCPDump capture indicating the traffic from a set of services 104 will be associated with a corresponding response. Continuing the example, data fields 102 that are related to the request or response will occur within a period of time between receipt of transmission of the request and receipt or transmission of the response.

As such, if a data field 102 is determined to be a request, at 306, a response that corresponds to the request may be determined. At 308, if the data field 102 is determined to be a response, a request that corresponds to the response may be determined. For example, a TCPDump capture or similar software may associate requests with corresponding responses using unique identifiers. Continuing the example, a service 104 may receive a data field 102 associated with a request, transmit the data field 102 to another service 104, and at a future time, receive a response to the data field 102. In some cases, the data field 102 may be transmitted to one or multiple intermediate (e.g., dependent) services 104 prior to receipt of the response by the initial service 104. Typically, data fields 102 that are associated with a request or response data field 102 will be transmitted close-in-time to the time at which the request or response is transmitted. As such, data fields 102 that are associated with the initial data field 102 will typically be transmitted within a threshold length of time of the time at which the data field 102 is received or transmitted by the service 104.

At 310, a window of time between receipt of the request and the corresponding response may be determined. For example, a data field 102 associated with a request may be received by a service 104 at a first time and a response may be received at a second time subsequent to the first time. The window of time may include the length of time between the first time and the second time. In some implementations, data fields 102 associated with the initial data field 102 may be transmitted during the window of time. In other implementations, data fields 102 associated with the initial data field 102 may be transmitted within a threshold length of time of the window of time. Use of a window of time to limit the data fields 102 that are analyzed may allow a small subset of a potentially large quantity of payloads 106 to be analyzed for correlations, rather than analysis of all data fields 102 associated with a set of services 104.

At 312, one or more data fields 102 that were transmitted within a threshold length of time of the window of time may be determined. The determined data fields 102 may have a value that is within a threshold similarity of the initial data field 102. For example, as described with regard to FIG. 1, a correlation module 120 may access filter data 122 that includes one or more threshold values indicative of a threshold level of similarity between data fields 102 that would indicate an association between the data fields 102. Data fields 102 transmitted close-in-time to an initial data field 102, that include a text string that is within a threshold similarity of the text string of the initial data field 102, may be associated with the initial data field 102. The association between the data fields 102 may indicate a relationship between the services 104 associated with the data fields 102, such as a direct or indirect dependency relationship.

At 314, independent of whether the initial data field 102 is an inbound data field 102, an outbound data field 102, a response, or a request, in response to the correspondence between the similar data fields 102, the similar data fields 102 may be classified as being correlated to the initial data field 102 without transcoding. For example, if the text strings of two data fields 102 are within a threshold similarity of one another without transcoding either of the data fields 102, this may enable an association between the data fields 102 to be determined without transcoding either of the data fields 102.

At 316, the initial data field 102 may be transcoded. Transcoding of the initial data field 102 may enable other associated data fields 102 that may correspond to the transcoded version of the initial data field 102, but not the original version of the initial data field 102, to be identified. For example, if a service 104 is configured to transcode a data field 102, and if transcoding of the data field 102 results in modification or loss of one or more characters of the text string, this may cause the data field 102 to become dissimilar to the initial data field 102 even if the services 104 associated with the data fields 102 have a dependency relationship. In such a case, transcoding the initial data field 102 may cause the text string of the initial data field 102 to be modified in a similar manner to the text strings present in the transcoded data fields 102 associated with the related services 104.

As such, at 318, one or more data fields 102 transmitted within a threshold time of the window of time that have a value within a threshold similarity of the value of the transcoded data field 102 may be determined.

At 320, in response to the correspondence between the similar data fields 102 (e.g., between the transcoded version of the initial data field 102 and another related data field 102), the similar data fields 102 may be classified as being correlated to the initial data field 102 with a transformation. In some implementations, an indication of the transformation, such as the specific encoding scheme to which the initial data field 102 was transcoded, may also be indicated. Associated data fields 102 may occur within a single service 104 or across multiple services 104.

Figure 4:
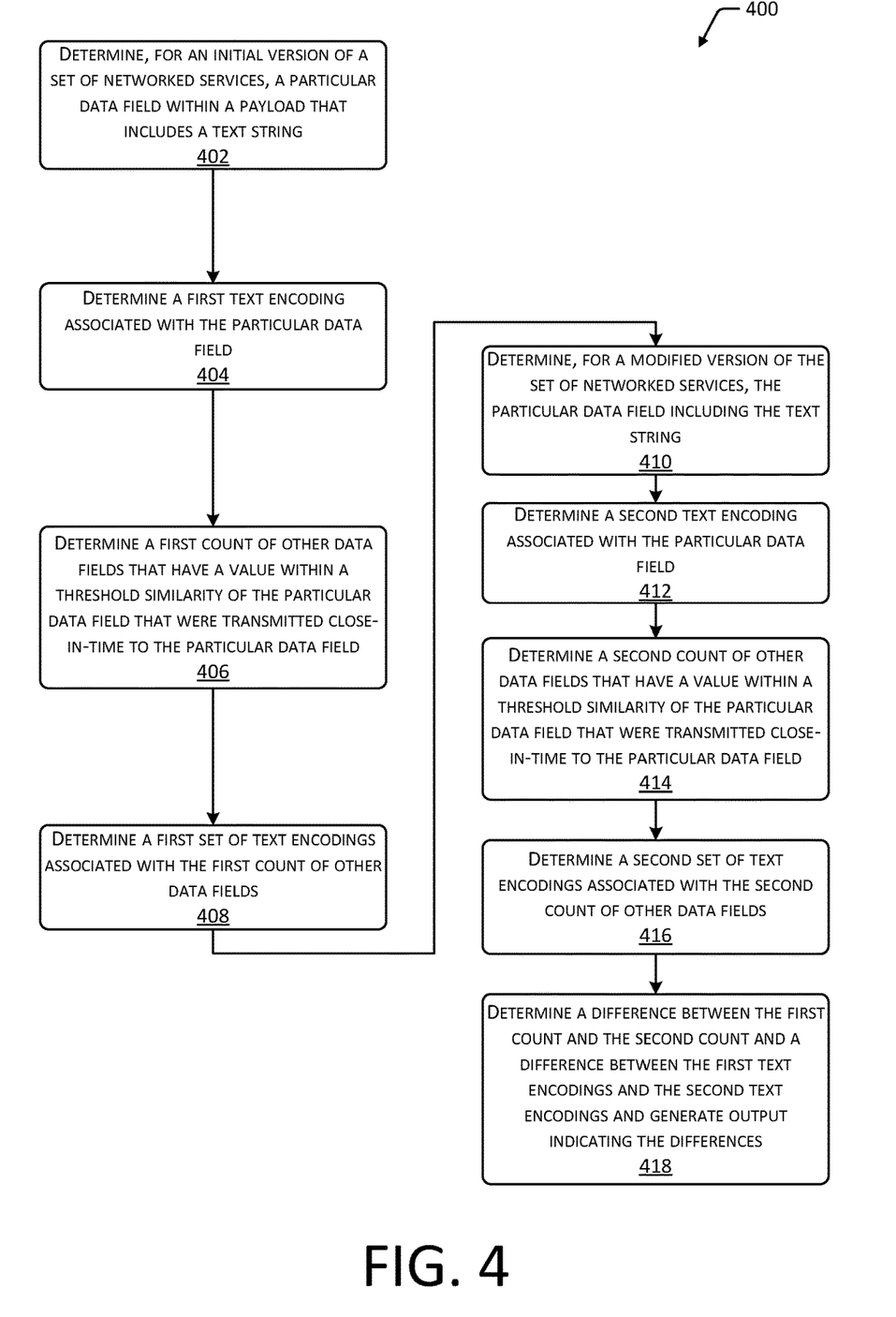
FIG. 4 is a flow diagram illustrating a method for determining differences in encoding schemes and data field associations for an initial set of services and a modified set of services.

FIG. 4 is a flow diagram 400 illustrating a method for determining differences in encoding schemes and data field associations for an initial set of services 104 and a modified set of services 104. As described previously, in some cases, one or more services 104 within an initial set of services 104 may be modified, such as by changing a particular service 104 to begin encoding text strings using UTF-8 encoding rather than Latin-1 encoding. In such cases, the possibility exists that modifying a particular service 104 may cause the data fields 102 processed by other services 104 to be modified or lost. For example, a service 104 configured to process data fields 102 using Latin-1 encoding that receives a data field 102 from the modified service 104 that has been encoded using UTF-8 may fail to properly decode or store one or more Unicode characters. Continuing the example, a text string that includes international characters, emojis, or other Unicode characters may become modified when encoded using a Latin-1 encoding scheme, such as by mapping the Unicode characters to different characters or causing certain Unicode characters to be lost. In some cases, determining an associated data field 102 that is correlated to a data field 102 from a modified service 104, for which the value in the data field 102 is not identical, may indicate that the data field 102 has been affected by the modification to the service 104. For example, attempting to encode the text string "Happy Birthday!" followed by an emoji using Latin-1 encoding may result in the text string being modified to "Happy Birthday!?" The difference between the two text strings may be used to determine that the modification to a particular service 104 has affected the ability of a second service 104 to properly process, encode, or decode text strings received from the particular service 104. In other cases, differences in the associations between data fields 102 and the encodings associated with the data fields 102 subsequent to modification of a service 104 may be used to determine other services 104 that may have been inadvertently affected by a modification.

At 402, for an initial version of a set of networked services 104, a particular data field 102 within a payload 106, that includes a text string, may be determined. As described with regard to FIGS. 1-3, a payload 106 may include multiple data fields 102, one or more of which may include a text string. A text determination module 110 may determine the data fields 102 that include text strings, enabling those data fields 102 to be analyzed while other data fields 102 may be disregarded.

At 404, a first text encoding associated with the particular data field 102 may be determined. Example methods for determining a text encoding scheme used in association with a particular data field 102 are described with regard to FIGS. 1 and 2. In other implementations, an existing text encoding scheme used to store text strings in a data field 102 may be known without analyzing the data field 102 to determine the text encoding scheme that is used. In some cases, the text encoding schemes determined by analyzing multiple payloads 106 may be determined. For example, if a particular data field 102 associated with Latin-1 encoding is analyzed 1,000 times, 950 instances may include text strings that do not include high-bit characters or Unicode, while 48 instances may include invalid Unicode and 2 instances may include valid Unicode.

At 406, a first count of other data fields 102 that have a value within a threshold similarity of the value stored in the particular data field 102 may be determined. The other data fields 102 may be transmitted close-in-time to the particular data field 102. As described with regard to FIG. 3, data fields 102 that are transmitted or received within a threshold length of time from which a particular data field 102 is transmitted or received, and that include a value that is within a threshold similarity of that of the particular data field 102 may be associated with one another. For example, the services 104 associated with the particular data field 102 and the associated data field 102 may be related. In some cases, multiple other data fields 102 may be associated with a particular data field 102. For example, multiple intermediate services may transmit a data field 102 before a response to an initial data field 102 is generated. As another example, a particular service 104 or another service 104 related to the particular service 104 may transmit multiple instances of a data field 102 to multiple receiving services 104. The number of data fields 102 that are determined to be associated with the particular data field 102 may be stored, such as by using a counter value.

At 408, a first set of text encodings associated with the first count of other data fields 102 may be determined. For example, each data field 102 determined to be associated with the particular data field 102 may use the same encoding scheme as that used by the particular data field 102, or a different encoding scheme.

One or more services within the initial set of services 104 may be modified, to form a modified set of services 104. In other cases, one or more new services 104 may be added to the initial set of services 104, or removed from the initial set of services 104, to form the modified set of services 104. After modifying one or more services 104, data indicative of the encoding schemes and associations between data fields 102 for the modified set of services 104 may be determined and compared to the data determined for the initial set of services 104 in blocks 402 through 408.

As such, at 410, for a modified version of the set of networked services 104, the particular data field 102 determined at block 402 that includes a text string may be determined. For example, the particular data field 102 may be modified to use a different encoding scheme, but the data field 102 may continue to store text strings.

At 412, a second text encoding associated with the particular data field 102 may be determined. As discussed previously, example methods for determining a text encoding scheme used to encode a text string in a data field 102 are described with regard to FIGS. 1 and 2. In other cases, the existing text encoding scheme for the particular data field 102 may be known without analyzing the particular data field 102, such as when modifying one or more services 104 to use a selected text encoding scheme. In some implementations, the text encoding schemes determined by analyzing multiple payloads 106 may be determined and recorded, as described with regard to block 404.

At 414, a second count of other data fields 102 that have a value within a threshold similarity of the particular data field 102 may be determined. The other data fields 102 may be received or transmitted close-in-time to the particular data field 102. As described with regard to FIG. 3, data fields 102 that are transmitted or received within a threshold length of time from which a particular data field 102 is transmitted or received are more likely to be associated with the particular data field 102. Additionally, data fields that include a value that is within a threshold similarity of that of the particular data field 102 may are likely to be associated with one another. The number of data fields 102 that are determined to be associated with the modified version of the particular data field 102 may be stored, such as by using a counter value. At 416, a second set of text encodings associated with the second count of other data fields 102 may be determined, such as by using one or more methods described with regard to FIGS. 1 and 2.

At 418, a difference between the first count and the second count, and a difference between the first text encodings and the second text encodings may be determined, and output indicating the differences may be generated. For example, if the count of data fields 102 that are associated with a particular data field 102 changes when a service 104 is modified, this difference may indicate that the value for a data field 102 has been modified, garbled, or lost due to the modification to the service 104. Because the particular data field 102 for which the value has changed may be identified, the particular service 104 associated with the modification or loss of data may be identified. Similarly, if the text encoding scheme associated with a particular data field 102 changes when a service is modified 104, this difference may indicate that one or more services 104 are not properly encoding or transcoding a text string prior to transmission of a data field 102. Because the particular data field 102 associated with the changed encoding scheme may be identified, the particular service 104 associated with the modified encoding scheme may be identified. In some implementations differences between text encoding schemes determined by analyzing multiple payloads 106 may be determined. For example, if analysis of a data field 102 yielded invalid Unicode a different number of times subsequent to modifying a service 104, the output may include an indication of this difference.

Figure 5:
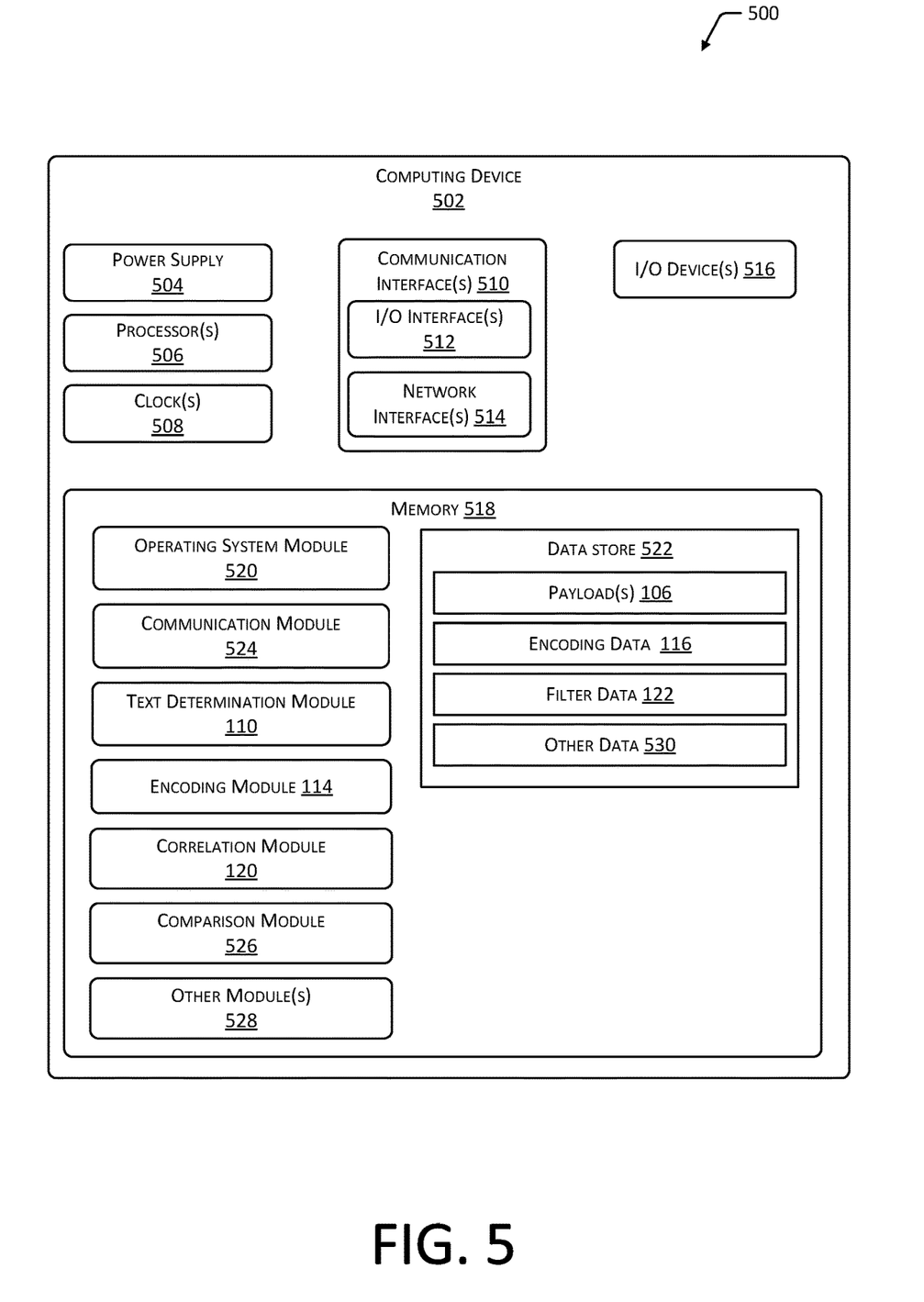
FIG. 5 is a block diagram illustrating a computing device within the scope of the present disclosure.

FIG. 5 is a block diagram 500 illustrating a computing device 502 within the scope of the present disclosure. The computing device may include one or more processing servers 108, client devices, devices executing one or more services 104, or other computing devices in communication with a processing server 108, client device, or service 104. While FIG. 5 depicts a single block diagram 500 representative of a computing device 502, any number of networked computing devices 502 may perform the implementations described herein.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input device or output device associated with the computing device 502. For example, I/O devices 516 may include touch sensors, keyboards, mouse devices, microphones, image sensors (e.g., cameras), scanners, displays, speakers, haptic devices, printers, weight sensors, code reading devices, RFID devices, NFC devices, and so forth. In some implementations, the I/O devices 516 may be physically incorporated with the computing device 502 or may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, LTE, and so forth.

The computing device 502 may include one or more busses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices 502, network attached storage devices, and so forth.

A communication module 524 may be configured to establish communications with one or more other computing devices 502. Communications may be authenticated, encrypted, and so forth.

The memory 518 may also store the text determination module 110. As described with regard to FIGS. 1-3, the text determination module 110 may access payloads 106 transmitted between services 104, such as through use of TCP-Dump or similar software, and determine particular data fields 102 within the payloads 106 that include text strings. Analysis of the data fields 102 that include text strings, while enabling other data fields 102 to be disregarded may reduce the time and cost associated with analysis of the payloads 106.

The memory 518 may additionally store the encoding module 114. As described with regard to FIGS. 1-2, the encoding module 114 may determine an encoding scheme associated with a particular data field 102. In some implementations, the encoding module 114 may determine correspondence between the bytes representing a text string stored in a data field and encoding data 116 that associates byte characteristics with encoding schemes. For example, the encoding module 114 may determine whether a text string includes high-bit characters, the number of bytes used to encode characters, and whether a data field 102 stores data using valid Unicode. Based on these byte characteristics, a text encoding scheme most likely used to encode data in the data field 102 may be determined. In some implementations, the encoding module 114 may be configured to decode the bytes stored in a data field 102, then re-encode the resulting text string, to determine the encoding scheme used to encode the text string. For example, decoding a text string using UTF-8 encoding, then re-encoding the text string and comparing the resulting re-encoded bytes to the initial bytes representing the text string may verify whether a data field 102 includes valid Unicode. If a data field 102 does not include valid Unicode, decoding and re-encoding a text string may result in modification or loss of data. In some implementations, the encoding module 114 may be configured to transcode a data field 102 to verify the text encoding scheme associated with the data field 102. For example, transcoding a data field 102 to Latin-1 encoding then determining whether the transcoded data field 102 includes valid Unicode may be used to determine whether the data field 102 is associated with double-encoded UTF-8.

The memory 518 may also store the correlation module 120. As described with regard to FIGS. 1-3, the correlation module 120 may determine associations between data fields 102. For example, if a data field 102 is transmitted from a first service 104 as an outbound data field 102 to a second service 104 that receives it as an inbound data field 102, the outbound and inbound data fields 102 may be determined to be associated. Similarly, as other services transmit, receive, and transcode other data fields 102 having a value within a threshold similarity of the initial data field 102, these other data fields 102 may be associated with the initial data field 102. The correlation module 120 may access filter data 122 to determine which data fields 102 may be associated with a particular data field 102. For example, an inbound data field 102 may be associated with outbound data fields 102 and vice versa. As another example, a data field 102 may be associated with other data fields 102 that were transmitted or received within a threshold length of time of the time at which the initial data field 102 was transmitted or received. Additionally, a data field 102 may be associated with other data fields 102 having a value within a threshold similarity of the value of the initial data field 102. In some implementations, the correlation module 120 may transcode a data field 102 and determine other data fields 102 having values within a threshold similarity of that of the transcoded version of the initial data field 102. Determining associations with the transcoded version of the initial data field 102 may identify data fields 102 that include modified or garbled versions of a text string, or data fields 102 for which at least a portion of the data has been lost due to transcoding.

The memory 518 may also store a comparison module 526, which may determine differences between encoding schemes and data field associations for a first set of services 104 and a second set of services 104. For example, one or more services 104 of a first set of services 104 may be modified to form a second set of services 104. Modifying one or more services 104 may cause a change in the encoding schemes used by other services 104 or a change in the value of text strings stored in a data field 102 that may cause the data field 102 to no longer be associated with other data fields 102. For example, if a modification to a first service 104 causes a second service 104 to receive a data field 102 having a different encoding, and a portion of the data stored in the data field 102 is modified or lost, this may cause the value in the data field 102 to no longer be within a threshold similarity of the values in other data fields 102.

For at least a subset of the data fields 102 that are analyzed, the comparison module 526 may determine a count of data fields 102 that are associated with a particular data field 102, and the encoding schemes used by each of the associated data fields. The comparison module 526 may also determine this information subsequent to modification of one or more services 104. Based on the differences in the counts of associated data fields 102 and the encoding schemes that are used, particular services 104 that may have been inadvertently affected by a modification to another service 104 may be determined.

Other modules 528 may also be present in the memory 518. For example, encryption modules may be used to encrypt and decrypt communications between computing devices 502. Authentication modules may be used to authenticate communications sent or received by computing devices 502. Other modules 528 may also include modules for receiving or modifying encoding data 116 or filter data 122, such as by receiving user input indicating a threshold level of similarity between associated data fields 102.

Other data 530 within the data store(s) 522 may include user input data, such as configurations, settings, preferences, and default values associated with computing devices 502. Other data 530 may include encryption keys and schema, access credentials, and so forth.

In different implementations, different computing devices 502 may have different capabilities or capacities. For example, processing servers 108 and servers that executed services 104 may have greater processing capabilities or data storage capacity than client devices.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions;
   one or more hardware processors to execute the computer-executable instructions to:
   determine a first data field received by a first service of an initial set of services, wherein the first data field includes a first text string encoded using a first encoding scheme to form a first set of bytes having first byte characteristics;
   determine first correspondence between the first byte characteristics and encoding data, wherein the encoding data associates byte characteristics with encoding schemes;
   based on the first correspondence, determine the first encoding scheme associated with the first data field;
   determine a first time at which the first data field is received by the first service;
   determine a plurality of data fields transmitted, within a threshold length of time of the first time, by one or more services of the initial set of services;
   determine a second data field of the plurality of data fields that includes a second text string encoded using the first encoding scheme to form a second set of bytes having second byte characteristics;
   determine, based on second correspondence between the second text string and the first text string, that the second text string and the first text string are within a threshold similarity;
   determine, based on third correspondence between the second byte characteristics and the encoding data, that the second text string is encoded using the first encoding scheme;
   in response to the second correspondence, generate a first association between the first data field and the second data field;
   modify the first service to cause the first service to begin encoding text strings using a second encoding scheme to form a third set of bytes having third byte characteristics;
   subsequent to modifying the first service, determine, based on fourth correspondence between the second text string and the first text string, that the second text string and the first text string are not within the threshold similarity; and
   generate output indicative of a first difference between the first data field and the second data field, wherein the output indicates the first service and a second service associated with the second data field.

2. The system of claim 1, further comprising computer-executable instructions to:
determine a second time associated with receipt of a response associated with the first data field by the first service;
determine a length of time between the first time and the second time; and
determine the threshold length of time based on the length of time between the first time and the second time.

3. The system of claim 1, wherein the second encoding scheme represents characters using Unicode points and the first encoding scheme is not associated with Unicode points.

4. The system of claim 1, further comprising computer-executable instructions to:
subsequent to modification of the first service, transcode the first data field to the first encoding scheme to form a transcoded data field;
based on fifth correspondence between the transcoded data field and the second data field, determine an association between the second data field and the first data field, wherein the association indicates a second difference in encoding schemes; and
include an indication of the second difference in the output.

5. A method comprising:
determining a first data field received by a first service of an initial set of services, wherein the first data field includes a first text string represented by a first set of bytes;
determining, based on first correspondence between the first set of bytes and encoding data that associates byte characteristics with encoding schemes, a first encoding scheme associated with the first data field;
determining one or more data fields transmitted by one or more services of the initial set of services, wherein a second data field of the one or more data fields includes a second text string represented by a second set of bytes;
determining, based on second correspondence between the second text string and the first text string, that the second text string and the first text string are within a first threshold similarity;
in response to the second correspondence, generating a first association between the first data field and the second data field;
determining a second encoding scheme associated with the second data field;
modifying at least one service of the initial set of services to form a modified set of services;
determining a third encoding scheme associated with the first text string of the first data field subsequent to modifying the at least one service;
determining a fourth encoding scheme associated with the second text string of the second data field subsequent to modifying the at least one service;
subsequent to modifying the at least one service, determining, based on third correspondence between the second text string and the first text string, a second association between the first data field and the second data field; and
generating output indicative of one or more of: a first difference between the first encoding scheme and the third encoding scheme, a second difference between the second encoding scheme and the fourth encoding scheme, or a third difference between the first association and the second association.

6. The method of claim 5, further comprising:
decoding the first set of bytes using the first encoding scheme to generate the first text string;
encoding the first text string using the first encoding scheme to generate a third set of bytes; and
determining that the first set of bytes and the third set of bytes are within a second threshold similarity to verify that the first encoding scheme is associated with the first data field.

7. The method of claim 5, further comprising:
transcoding the first set of bytes from the first encoding scheme to an alternate encoding scheme to generate a third set of bytes; and
determining, based on fourth correspondence between the third set of bytes and the encoding data, that the third set of bytes corresponds to the alternate encoding scheme to verify that the first encoding scheme is associated with the first data field.

8. The method of claim 5, further comprising:
determining a first time at which the first data field is received by the first service;
determining a second time at which a response associated with the first data field is received by the first service;
determining a threshold length of time based on a length of time between the first time and the second time; and
determining that the one or more data fields transmitted by the one or more services of the initial set of services were transmitted within the threshold length of time from one or more of the first time or the second time.

9. The method of claim 5, further comprising:
transcoding the first set of bytes from the first encoding scheme to an alternate encoding scheme to generate a third set of bytes;
determining a third data field of the one or more data fields, wherein the third data field includes a third text string represented by the third set of bytes;
determining, based on fourth correspondence between the third text string and the first text string, that the third text string and the first text string are within the first threshold similarity; and
in response to the fourth correspondence, generating a third association between the first data field and the third data field.

10. The method of claim 5, further comprising:
determining fourth correspondence between a first subset of the one or more data fields and the first data field received by the first service; and
based on the fourth correspondence, determining a first count of the first subset of the one or more data fields having values within the first threshold similarity of a value of the first data field.

11. The method of claim 10, further comprising:
subsequent to modifying the at least one service, determining fifth correspondence between a second subset of the one or more data fields and the first data field;
based on the fifth correspondence, determining a second count of the second subset of the one or more data fields having values within the first threshold similarity of the value of the first data field;
determining a fourth difference between the first count and the second count; and
including an indication of the fourth difference in the output.

12. The method of claim 5, wherein one of the first encoding scheme or the second encoding scheme includes a Unicode-based encoding scheme and the other of the first encoding scheme or the second encoding scheme includes a non-Unicode-based encoding scheme.

13. A system comprising:
one or more memories storing computer-executable instructions;
one or more hardware processors to execute the computer-executable instructions to:
determine a first data field received by a first service of an initial set of services, wherein the first data field includes a first text string represented by a first set of bytes;
determine one or more byte characteristics of the first set of bytes;
determine first correspondence between the one or more byte characteristics and encoding data that associates byte characteristics with encoding schemes;
based on the first correspondence, determine a first encoding scheme associated with the first data field;
determine a second data field transmitted by one or more services of the initial set of services, wherein the second data field includes a second text string represented by a second set of bytes;
determine that the second text string is within a threshold similarity of the first text string;
in response to the second text string being within the threshold similarity of the first text string, generate a first association between the first data field and the second data field;
determine a second encoding scheme associated with the second data field; and
generate output indicative of the first encoding scheme, the second encoding scheme, and the first association.

14. The system of claim 13, further comprising computer-executable instructions to:
modify at least one service of the initial set of services to form a modified set of services;
determine a third encoding scheme associated with the first data field subsequent to modifying the at least one service;
determine a fourth encoding scheme associated with the second data field subsequent to modifying the at least one service;
determine, based on second correspondence between the second text string and the first text string, a second association between the first data field and the second data field; and
include, in the output, an indication of one or more of: a first difference between the first encoding scheme and the third encoding scheme, a second difference between the second encoding scheme and the fourth encoding scheme, or a third difference between the first association and the second association.

15. The system of claim 13, wherein the computer-executable instructions to determine the first encoding scheme include computer-executable instructions to:
decode the first set of bytes using the first encoding scheme to generate the first text string;
encode the first text string using the first encoding scheme to generate a third set of bytes; and
determine second correspondence between the first set of bytes and the third set of bytes, wherein the second correspondence indicates that the first encoding scheme is associated with the first data field.

16. The system of claim 13, further comprising computer-executable instructions to:
transcode the first set of bytes from the first encoding scheme to an alternate encoding scheme to generate a third set of bytes.

17. The system of claim 16, further comprising computer-executable instructions to:
determine second correspondence between the third set of bytes and the encoding data; and
based on the second correspondence, determine that the third set of bytes corresponds to the alternate encoding scheme, wherein the second correspondence indicates that the first set of bytes is associated with the first encoding scheme.

18. The system of claim 16, further comprising computer-executable instructions to:
determine a lack of correspondence between the third set of bytes and the encoding data; and
based on the lack of correspondence between the third set of bytes and the encoding data, determine that the first data field is associated with a third encoding scheme that differs from the first encoding scheme.

19. The system of claim 13, further comprising computer-executable instructions to:
determine a first time at which the first data field is received by the first service;
receive, at a second time, a response associated with the first data field;
determine a threshold length of time based on a length of time between the first time and the second time; and
determine that the second data field is transmitted within the threshold length of time of one or more of the first time or the second time.

20. The system of claim 19, further comprising computer-executable instructions to:
transcode the first set of bytes from the first encoding scheme to an alternate encoding scheme to generate a third set of bytes;
determine a third data field transmitted by the one or more services of the initial set of services within the threshold length of time from the first time, wherein the third data field includes a third text string represented by the third set of bytes;
determine, based on second correspondence between the third text string and the first text string, that the third text string and the first text string are within the threshold similarity;
in response to the second correspondence, generate a second association between the first data field and the third data field; and
include an indication of the second association in the output.

* * * * *